(12) United States Patent
Tempongko

(10) Patent No.: US 6,186,349 B1
(45) Date of Patent: *Feb. 13, 2001

(54) CYLINDRICAL CASE

(75) Inventor: David Tempongko, Henderson, NV (US)

(73) Assignee: Bee Incorporated, Las Vegas, NV (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/249,836

(22) Filed: Feb. 12, 1999

(51) Int. Cl.[7] .............. B65D 8/00; B65D 85/57
(52) U.S. Cl. .......... 220/4.22; 206/309; 206/457; 220/4.23; 220/8
(58) Field of Search .............. 220/4.22, 4.24, 220/4.25, 8, 4.23; 206/457, 216, 303, 309; 229/938

(56) References Cited

U.S. PATENT DOCUMENTS

| | | | |
|---|---|---|---|
| D. 309,433 | * 7/1990 | Minuti | D9/424 |
| 1,144,736 | * 6/1915 | Smith | 312/9.42 |
| 1,497,199 | * 6/1924 | Sutthoff | 220/4.22 X |
| 2,165,122 | * 7/1939 | Ashbery | 312/9.42 |
| 2,765,949 | * 10/1956 | Hillman | 220/840 X |
| 3,051,537 | * 8/1962 | Diehl et al. | 312/9.42 |
| 3,429,629 | * 2/1969 | Cilia | 312/9.9 |
| 3,876,072 | * 4/1975 | Phillips | 206/395 |
| 4,294,299 | * 10/1981 | Dorsen et al. | 150/123 |
| 4,811,998 | * 3/1989 | Rankin | 312/229 |
| 5,325,978 | * 7/1994 | Rabig | 220/4.24 |
| 5,535,884 | * 7/1996 | Scott et al. | 206/445 |

FOREIGN PATENT DOCUMENTS

965155 * 6/1957 (DE) .............. 220/23.4

* cited by examiner

Primary Examiner—Allan N. Shoap
Assistant Examiner—Joe Merek
(74) Attorney, Agent, or Firm—O'Melveny & Myers LLP

(57) ABSTRACT

A case composed of at least two shells. In a preferred embodiment, two semi-cylindrical shells are provided. The shells are coupled for relative rotation about an axis and are sized so that each shell segment nests within an adjacent shell. The shells are rotatable between a closed position, in which the shells cooperate to define an enclosed compartment, and an open position, in which said shells nest inside one another to provide access to the compartment.

10 Claims, 3 Drawing Sheets

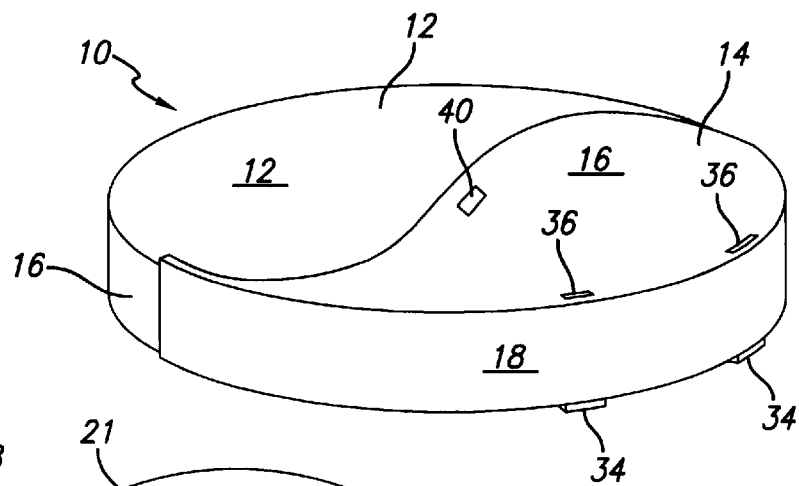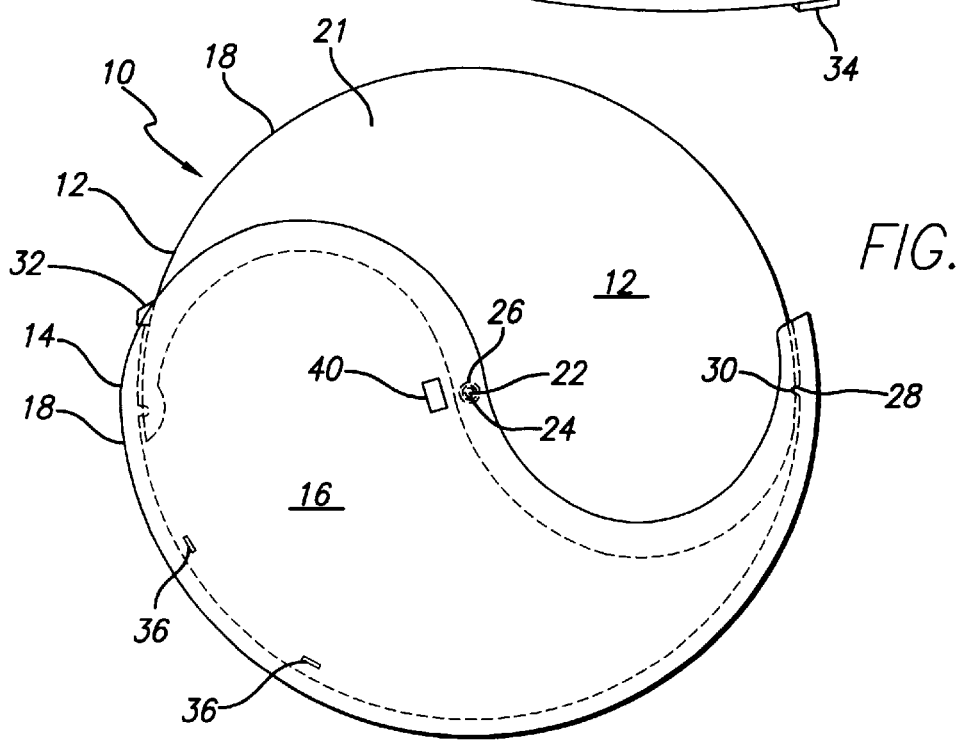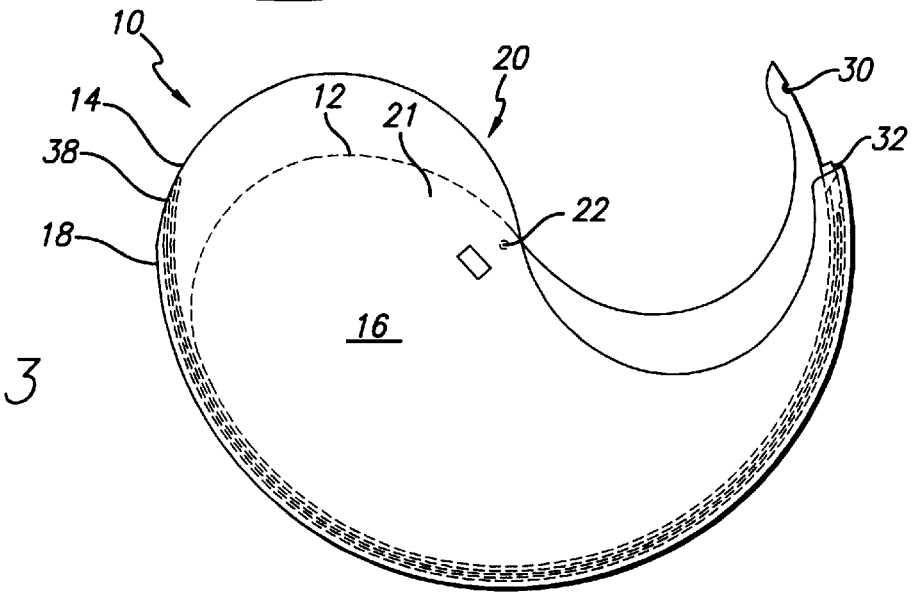

CYLINDRICAL CASE

FIELD OF THE INVENTION

The present invention is a case. Specifically, the present device is a case with a cylindrical compartment which opens rotationally.

BACKGROUND OF THE INVENTION

Many objects are preferably stored and shipped in cylindrical cases due to the shape of the object. For example, film reels are stored and shipped in cylindrical canisters having two cylindrical halves which assemble in a mating fashion with one half fitting into a flange on the opposite half. One drawback of these canisters is that the halves may be pried open and, thus, the canister does not secure the contents against theft or other tampering. Yet another drawback of these canisters is they cannot be opened with a single hand; one hand must hold each half of the canister to pull the halves apart.

Many other objects could be stored and shipped in cylindrical cases but are not because no practical case has been developed. For example, circular media, such as compact discs, digital video discs, phonograph records, and the like, are shipped and stored in square containers. Compact discs and digital video discs, in particular, are shipped and stored in square, hinged cases which open and close with a folding motion.

These hinged cases have several drawbacks. First, the hinges are easily broken, thereby rendering the case useless. Second, a user must use two hands to open the case. This can be very dangerous, especially while driving. Third, the case itself is not very compact because the case essentially doubles in size when it is opened. Fourth, to store the cases, either the cases must be retained in a holder or the discs themselves must be transferred from the cases to a holder because the individual cases cannot be connected together. Lastly, the hinged case may be costly because the case is typically composed of three pieces: a front, a back, and an insert which secures the disc by engaging the disc's central hole.

Yet other objects do not necessarily need to be stored or shipped in cylindrical cases but, because of security concerns, are preferably stored in cases which are difficult to pry open but still allow quick access to the contents. For example, gun cases are typically rectangular and open in a hinged fashion. However, many of these gun cases can be pried open. Moreover, these gun cases can be difficult to open quickly.

It can be seen that there is a need in the art for a cylindrical case which is easy to open with a single hand, is compact, connects to other cases for storage, provides security from tampering or opening, and can be applied to a variety of uses.

SUMMARY OF THE INVENTION

The present invention is a case composed of at least two shells. The shells preferably have the same shape. The shells are open along their radial faces and each shell is slightly smaller than one of the adjacent shells so that the each shell may nest within an adjacent shell. The shells are coupled for relative rotation about an axis so that the shells are rotatable between a closed position, in which the shells cooperate to define an enclosed compartment, and an open position, in which said shells nest inside one another to thereby provide access to said compartment.

In a preferred embodiment, two semi-cylindrical shells are provided. The first shell has an axis and is open along its diametrical face. The second shell is slightly smaller than the first shell so that the second shell may nest within the first shell. Like the first shell, the second shell is open along its diametrical face. In a preferred embodiment, the first and second shells have substantially the same shape. For example, the shells could be semi-circular or teardrop shaped.

The second shell is coupled to the first shell for relative rotation around an axis. The second shell is rotatable between a closed position, in which the first and second shell cooperate to define an enclosed cylindrical compartment, and an open position, in which said second shell nests inside said first shell to provide access to the compartment through the open diametrical faces.

Preferably, the first shell includes means for locking the second shell in the closed position. The locking means could include a conventional key operated lock known in the art, a spring lock, a stop, or the like. The cylindrical case may also include means, such as a mating protrusions and slots, for connecting the cylindrical case to like cylindrical cases.

An object of the present invention is to provide a case which can be opened with a single hand. A further object of the invention is to provide a compact case which is shaped to contain circular or cylindrical objects. Yet another object of the invention is to provide a case which is more difficult for unauthorized persons to open than conventional boxes.

BRIEF DESCRIPTION OF THE DRAWINGS

FIG. 1 is a perspective view of the assembled cylindrical case with the outer shell in a closed position;

FIG. 2 is a side view of the assembled cylindrical case of the embodiment of FIG. 1 with the outer shell in a closed position;

FIG. 3 is a side view of the assembled cylindrical case of the embodiment of FIG. 1 with the outer shell in an open position;

DESCRIPTION

Figure 5:
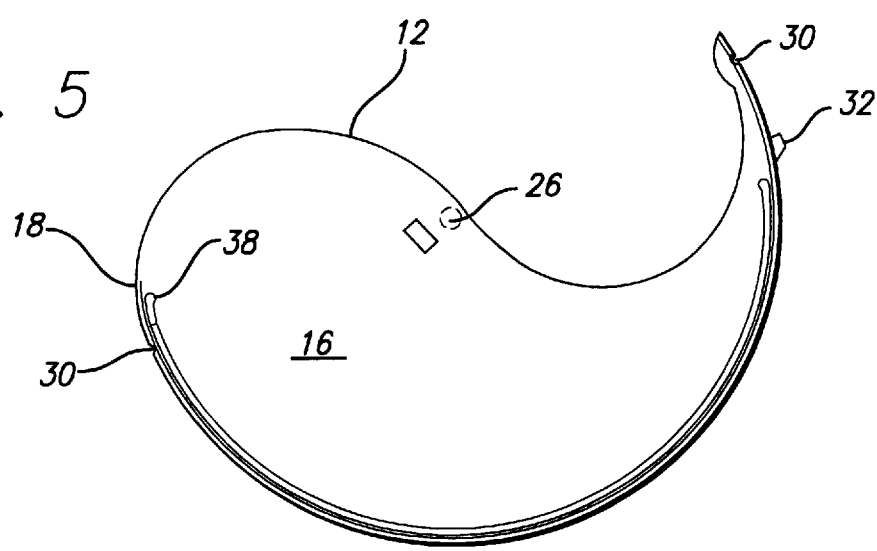
FIG. 5 is a side view of the inner shell of the embodiment of FIG. 1.
Figure 6:
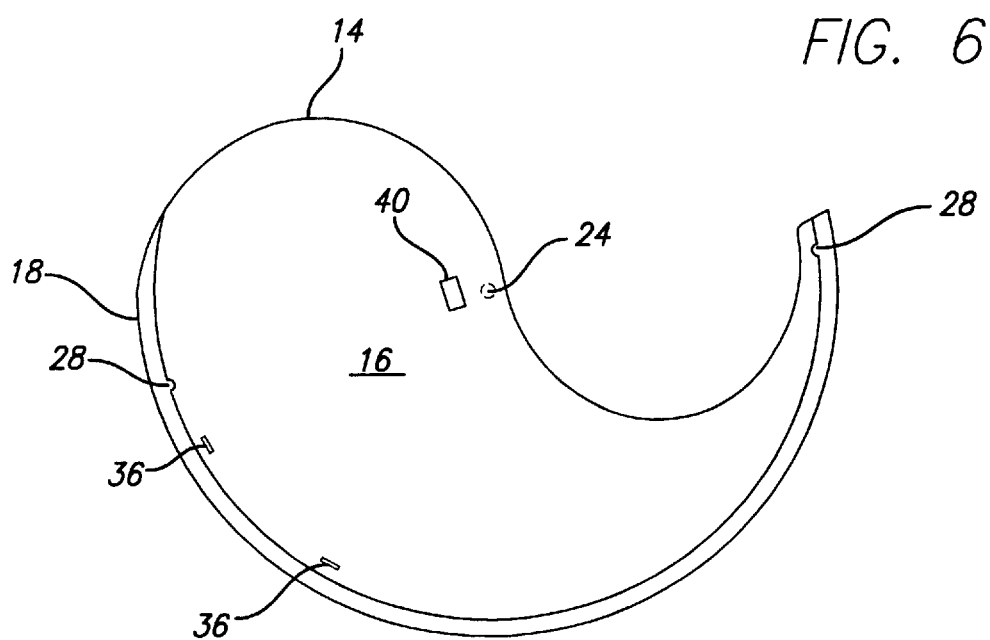
FIG. 6 is a side view of the outer shell of the embodiment of FIG. 1.

Reference is now made to the figures wherein like parts are referred to by like numerals throughout. The cylindrical case 10 of the present invention comprises a plurality of shells. In the preferred embodiment shown in FIGS. 1 and 2, two shells, an inner shell 12 and an outer shell 14, are provided. Each shell 12, 14 has two substantially parallel side walls 16 and a contoured edge wall 18 to form a cylinder segment with open radial faces 20. The shells 12, 14 have complementary shapes so that the cylinder segments cooperate to enclose a compartment 21 when the shells 12, 14 are in a closed position. For example, in a preferred embodiment, each shell 12, 14 is semi-cylindrical with tapered teardrop-shaped side walls 16 and an open face 20 along an S-shaped line defined by teardrop-shaped side walls 16, across its diameter as shown in FIGS. 5 and 6. The open face 20 being spaced from the edge wall 18 adjacent to one end of the S-shaped line as shown in FIG. 2. Although in the preferred embodiment the inner shell 12 and outer shell 14 have substantially the same shape, it is contemplated that the shells 12, 14 need not have substantially the same shape. In other words, if there are three shells, it is not necessary that each shell have the shape of one-third of a cylinder. In fact, it is contemplated that the outer shell 14 may be any shape, such as arcuate or polygonal, so long as the inner shell 12 may nest inside the outer shell 14 as described below.

Figure 4:
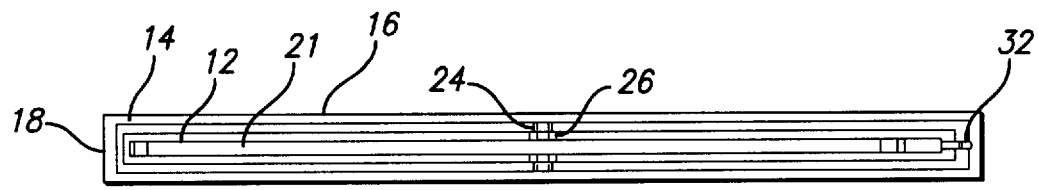
FIG. 4 is an edge view of the assembled cylindrical case of the embodiment of FIG. 1 with the outer shell in an open position.

The inner shell 12 is sized and shaped to nest inside the outer shell 14 when in an open position as shown in FIGS. 3 and 4. In the open position, a user may access the interior of the shells 12, 14 through the open diametrical face 20 to remove objects from or insert objects into the interior of the inner shell 12. In the closed position, the shells 12, 14 cooperate to enclose a substantially cylindrical compartment 21 bounded by the side walls 16 and edge walls 18 of the shells 12, 14 as shown in FIG. 2. The cylindrical compartment 21 is particularly useful for containing circular or cylindrical objects such as compact discs, phonograph records, film reels, magnetic tape reels, or the like. Moreover, because the cylindrical case 10 walls are secured from unauthorized access as described below, objects such as firearms, valuables, or the like may be securely stored in the cylindrical compartment 21.

The shells 12,14 may be composed of a variety of materials. For example, where security is of concern, the shells 12,14 may be made of metal or a like material. Where a lightweight cylindrical case 10 is desired, the shells 12, 14 may be made of plastic or a similar material.

The shells 12, 14 are coupled at an axis 22 so that the shells 12, 14 may be rotated from a closed position shown in FIG. 2 to an open position shown in FIG. 3. The axis of rotation is located substantially at the center of the case when the inner shell is in the closed position. Although an axle running through the axis 22 could be used to rotatably couple the shells 12, 14, in a preferred embodiment spindles 24 are disposed on the side walls 16 at the axis 22 on one shell and mating holes 26 are disposed on the side walls 16 at opposing points on the other shell. The holes 26 could be through-holes or depressions. The cylindrical case 10 is assembled by inserting the spindles 24 into the mating holes 26 so that the inner shell 12 and outer shell 14 rotate relative to one another. Although in a preferred embodiment the spindles 24 are disposed on the outer shell 14 and the holes 26 are disposed on the inner shell 12, the positions of the spindles 24 and holes 26 could be reversed with the spindles 24 on the inner shell 12 and the holes 26 on the outer shell 14. Preferably, the spindles 24 and holes 26 are located a short distance from the open face 20 of the shell 12,14 so that the margins of the side walls 16 overlap when the shells 12, 14 are in the closed position.

Figure 7:
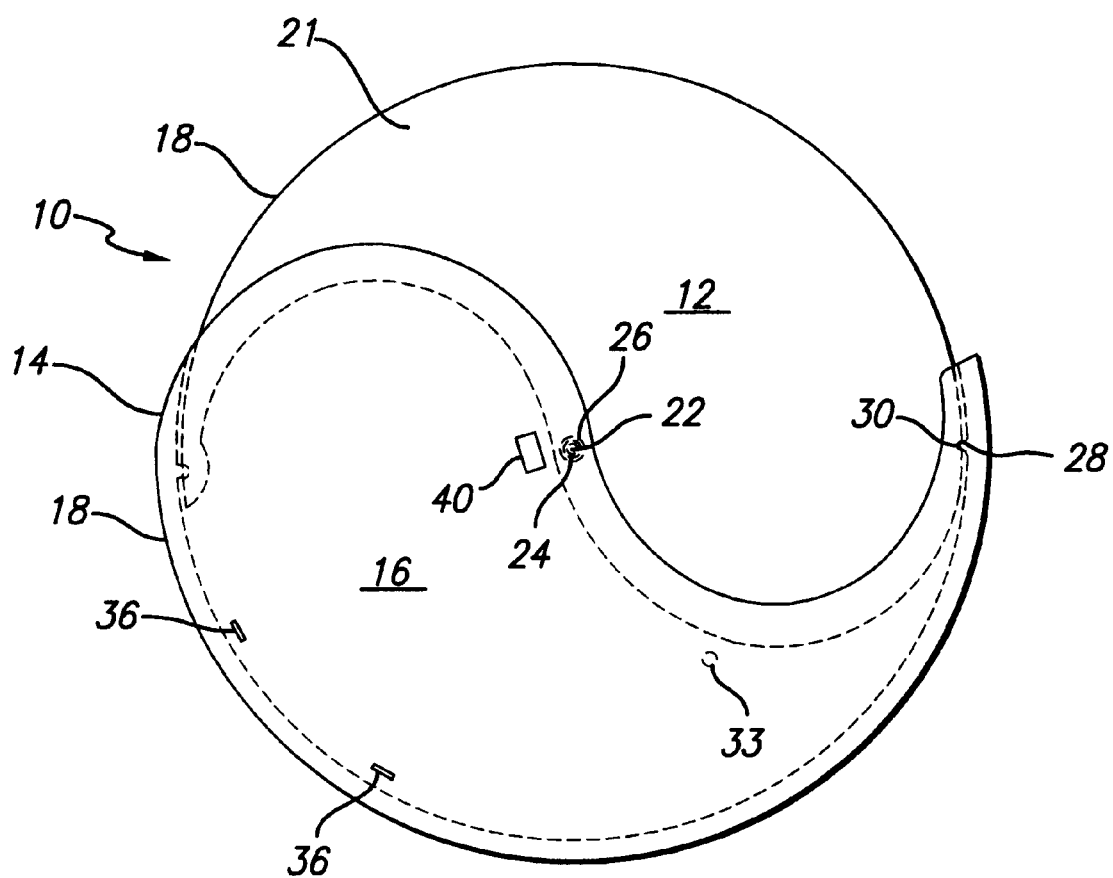
FIG. 7 is a side view of an alternate embodiment of the assembled cylindrical case with the outer shell in the closed position.

In a preferred embodiment of the present invention, the cylindrical case 10 includes a means for locking the shells 12, 14 in the closed position. The locking means could include a conventional key operated lock, a friction lock, or the like. In an embodiment in which security is a concern, such as when firearms are stored in the cylindrical case 10, a conventional key operated lock disposed on one shell engages a ridge, groove, or the like on the other shell. In an embodiment in which there is little concern for security, at least one friction lock is provided in which a ridge 28 on the edge wall 18 of the outer shell 14 engages an indentation 30 on the edge wall 18 of the inner shell 12 when the shells 12, 14 are in a closed position. The edge wall 18 of the inner shell 12 may also include a barb-shaped stop 32 to bear against the edge wall 18 of the outer shell 14 when the shells 12, 14 are in a closed position to prevent over-rotation of the shells 12, 14. Alternatively, a raised circular stop 33 may be disposed on the inside of an outer shell 14 side wall 16 to engage the inner shell 12 side wall 16 to prevent over-rotation of the shells 12, 14 as shown in FIG. 7.

Referring again to FIGS. 1 and 2, when in a closed and locked position, it will be difficult to pry the cylindrical case 10 open at the side walls 16 because the side walls 16 overlap. Likewise, it will be difficult to pry the edge walls 18 open because the edge walls 18 are braced against bending by the side walls 16. Thus, the present cylindrical case 10 may be used to store objects which require some amount of security such as firearms. Likewise, the present cylindrical case 10 may be used for objects, such as motion picture film or other valuables, where theft-deterrence is desirable.

The present invention may also include a means for interconnecting a the outer shell 14 of a cylindrical case 10 to the outer shell 14 of an adjacent cylindrical case 10. The preferred embodiment includes one or more protuberances 34 on one side wall 16 of the outer shell 14 which engage slots 36 on an opposite side wall 16 of an adjacent outer shell 14. That is, one side wall 16 includes a male connector and the other side wall 16 includes a female connector such that a stack of cylindrical cases 10 may be matingly engaged to one another.

If the contents of the cylindrical case 10 are round or cylindrical, a conventional U-shaped spring 38 found in the prior art may be disposed on the interior of the inner shell 12 to secure the contents. Likewise, the compartment 21 may be lined with padding or the like to protect the contents from impact damage.

A means for verifying the authenticity of the contents may be inscribed or imbedded into the cylindrical case 10. For example, a laser etching, hologram, or similar marking 40 may be embossed or etched into the material of the case 10 and a matching designation may be embossed on a contents. This would provide a verification that the contents are authorized by the producer of the case 10 and that the contents are genuine.

An advantage of the present invention is that the cylindrical case 10 may be opened with a single hand because the shells 12, 14 engage in a pivotal fashion rather than a hinged fashion. A further advantage of the invention is that the cylindrical case 10 is shaped to contain circular objects without excess material or wasted space. Yet another advantage of the invention is that the case 10 is more difficult for unauthorized persons to open than conventional boxes because the side walls 16 and edge walls 18 brace one another against bending and because the side walls 16 overlap. Another advantage of the invention is that the cylindrical cases 10 are interconnecting.

I claim:
1. A cylindrical case, comprising:
an outer shell, comprising outer side walls joined by an outer edge wall around a perimeter of said case, and an outer open face extending along an S-shaped line defined by said outer side walls, said outer shell comprising a segment of said cylindrical case, an said outer open face being spaced from said outer edge wall adjacent to one end of said S-shaped line;
an inner shell, comprising inner side walls joined by an inner edge wall around a perimeter of said case, and an inner open face extending along an S-shaped line defined by said inner side walls, said inner shell com- prising a segment of said cylindrical case complementary to said outer shell;

wherein said inner shell is coupled to said outer shell for relative rotation about an axis of rotation, said axis located substantially at a center of said case when said inner shell is in a closed position, whereby said inner shell is rotatable between an open position in which said inner shell nests inside said outer shell with said inner open face substantially aligned with said outer open face, thereby providing access to an interior of said case, and said closed position in which said inner shell and said outer shell cooperate to enclose a cylindrical compartment.

2. The case according to claim 1, further comprising a stop disposed on an interior of at least one of said outer side walls to bear against said inner shell when said inner shell is in said open position to prevent over rotation of said inner shell.

3. The case according to claim 1, further comprising a ridge disposed on an interior of said outer edge wall, said ridge engaging an indentation on an exterior of said inner edge wall when said inner shell is in said closed position, to resist rotation of said inner shell.

4. The case according to claim 1, further comprising an indentation disposed on an interior of said outer edge wall, said indentation engaging a ridge on an exterior of said inner edge wall when said inner shell is in said closed position, to resist rotation of said inner shell.

5. The case according to claim 1, further comprising a U-shaped spring disposed on an interior of said inner shell, for retaining at least one media disk.

6. The case according to claim 1, further comprising padding material on an interior of said case.

7. The case according to claim 1, wherein said cylindrical case further comprises two circular ends defined by said inner side walls and said outer side walls when said inner shell is in said closed position, and further comprising means for connecting one of said ends of said case to an end of an adjacent case, so that said case and said adjacent case are substantially aligned along their respective perimeters.

8. The case according to claim 7, wherein said means for connecting comprises a first protuberance on a first one of said ends, and a slot on a second one of said ends, wherein said slot is configured to mate with a second protuberance having the same shape as the first protuberance.

9. The case according to claim 1, wherein said case is adapted for enclosing at least one media disk, and wherein said inner side walls are spaced to maintain the at least one media disk substantially perpendicular to said axis.

10. The case according to claim 1, wherein said case is adapted for enclosing at least one media disk, and wherein said inner shell and said outer shell are configured for insertion and removal of the at least one media disk when said inner shell is in said open position, and for enclosing the at least one media disk when said inner shell is in said closed position.

* * * * *